United States Patent
Kamata et al.

(10) Patent No.: US 6,954,341 B2
(45) Date of Patent: Oct. 11, 2005

(54) MAGNETO-RESISTIVE SENSOR WITH OXIDIZATION-RESISTANT CONDUCTIVE LAYER BETWEEN CAP LAYER AND ELECTRODE OVERHANG

(75) Inventors: Chikayoshi Kamata, Kawasaki (JP); Hitoshi Kishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/748,919

(22) Filed: Dec. 27, 2000

(65) Prior Publication Data

US 2001/0026424 A1 Oct. 4, 2001

(30) Foreign Application Priority Data

Mar. 29, 2000 (JP) ........................................ 2000-092227

(51) Int. Cl.[7] ............................................... G11B 5/39
(52) U.S. Cl. ..................... 360/322; 360/324.1
(58) Field of Search ............................... 360/126, 113, 360/322, 321, 323, 324.1

(56) References Cited

U.S. PATENT DOCUMENTS

| | | | | |
|---|---|---|---|---|
| 4,821,012 A | * | 4/1989 | Kamo et al. ............ | 338/32 R |
| 5,287,238 A | * | 2/1994 | Baumgart et al. ......... | 360/314 |
| 5,327,313 A | * | 7/1994 | Nishioka et al. ......... | 360/322 |
| 5,491,600 A | * | 2/1996 | Chen et al. ............. | 360/322 |
| 5,883,764 A | * | 3/1999 | Pinarbasi .............. | 360/322 |
| 5,946,167 A | * | 8/1999 | Hara et al. ............ | 360/322 |
| 6,185,078 B1 | * | 2/2001 | Lin et al. ............. | 360/324.1 |
| 6,228,276 B1 | * | 5/2001 | Ju et al. .............. | 216/22 |
| 6,274,025 B1 | * | 8/2001 | Chang et al. ........... | 205/118 |
| 6,341,052 B2 | * | 1/2002 | Hayashi ................ | 360/324.1 |
| 6,342,993 B1 | * | 1/2002 | Sato ................... | 360/319 |
| 6,493,194 B1 | * | 12/2002 | Sakaguchi et al. ...... | 360/322 |
| 6,535,363 B1 | * | 3/2003 | Hosomi et al. ......... | 360/324.1 |
| 6,570,745 B1 | * | 5/2003 | Gill ................... | 360/322 |

FOREIGN PATENT DOCUMENTS

JP          10313138 A    11/1998

* cited by examiner

*Primary Examiner*—Craig A. Renner
(74) *Attorney, Agent, or Firm*—Greer, Burns & Crain, Ltd

(57) ABSTRACT

A magneto-resistive magnetic sensor has an overlay-type structure and includes a cap layer on a top surface of a magneto-resistive structure and a pair of electrodes provided on said cap layer with a separation from each other, wherein there is interposed an oxidation-resistant conductive film underneath each electrode, such that the oxidation-resistant conductive film is sandwiched between the cap film and the electrode.

17 Claims, 7 Drawing Sheets

US 6,954,341 B2

MAGNETO-RESISTIVE SENSOR WITH OXIDIZATION-RESISTANT CONDUCTIVE LAYER BETWEEN CAP LAYER AND ELECTRODE OVERHANG

CROSS-REFERENCE TO RELATED APPLICATION

The present application is based on Japanese priority application No.2000-092227 filed on Mar. 29, 2000, the entire contents of which are hereby incorporated by reference.

BACKGROUND OF THE INVENTION

The present invention generally relates to magnetic sensors and more particularly to a giant magneto-resistive device and a magnetic head using such a giant magneto-resistive sensor.

Magneto-resistive sensors are used extensively in magnetic heads of various conventional magnetic disk drives for reading information from a magnetic track formed on a magnetic disk.

A giant magneto-resistive sensor is a magnetic sensor having a superior magnetic sensitivity over an ordinary magneto-resistive sensor and is used in high-density magnetic disk drives. A typical example of a giant magneto-resistive sensor is a spin-valve sensor that can provide a magneto-resistive ratio exceeding 6%. A spin-valve sensor detects a magneto-resistance between a ferromagnetic free layer having a variable magnetization and a ferromagnetic pinned layer having a pinned magnetization, wherein the pinning of magnetization of the pinned layer is caused by an exchange coupling with an anti-ferromagnetic layer provided adjacent to the pinned layer, wherein the anti-ferromagnetic layer acts as a pinning layer to the pinned layer.

With ever-increasing trend of recording density in the technology of disk storage devices, the importance of giant magneto-resistive sensor has increased evermore.

In a high-density magnetic disk of the future, a recording density of 40 Gbit/inch$^2$ is projected. In such a high-density magnetic recording device, the magnetic disk carries recording tracks with a pitch of 57–80 kTPI, which corresponds to a track separation of 0.45–0.32 µm. In order to pick up magnetic signals from such high-density tracks, it is necessary to narrow the width (read-core width) of the giant magneto-resistive sensor to be 0.25 µm or less. In order to reduce the width of the giant magneto-resistive magnetic sensor, it is inevitable to apply a photolithographic process.

However, such a use of photolithographic process in the fabrication process of a giant magneto-resistive sensor raises a serious problem of oxidation of the anti-ferromagnetic layer used therein during the photolithographic process, which is conducted in the atmosphere. Further, the process of removing a resist mask may cause damage in the anti-ferromagnetic layer by the chemicals used for the removal of the resist mask.

Thus, it has been practiced in the art of giant magneto-resistive sensor of highly miniaturized width to protect the anti-ferromagnetic film in the photolithographic process by a metal cap film not reacting with the anti-ferromagnetic film, such as Ta.

FIG. 1 shows the construction of a miniaturized spin-valve sensor 10 according to a related art.

Referring to FIG. 1, the magnetic sensor 10 includes a magneto-resistive layer 13 for detecting a magnetic signal Hsig, wherein the magneto-resistive layer 13 has a standard layered structure of a spin-valve magnetic sensor and includes a ferromagnetic free layer, a ferromagnetic pinned layer, a conductive intermediate layer interposed between the free layer and the pinned layer, and an anti-ferromagnetic pinning layer provided on the pinned layer. For picking up magnetic signals Hsig from the magnetic tracks having an extremely miniaturized width, the magneto-resistive layer 13 also has a reduced width W. Such a miniaturized magneto-resistive layer 13 is obtained by conducting a photolithographic process as noted before. Thereby, it should be noted that the top surface of the magneto-resistive layer 13 of the construction of FIG. 1 is covered with a metal cap film such as Ta.

Further, the spin-valve sensor 10 of FIG. 1 includes a pair of domain-control regions 12A and 12B of a hard magnetic material disposed at both lateral sides of the magneto-resistive layer 13, and electrodes 11A and 11B are provided on the foregoing domain-control regions 12A and 12B, respectively. The spin-valve sensor 10 of FIG. 1 is called "abutted type sensor."

In the construction of FIG. 1, it should be noted that the domain-control regions 12A and 12B have a predetermined magnetization 15 not responding to the external magnetic signal Hsig to the magneto-resistive layer 13 due to the large coercive force pertinent to a hard magnetic material, and the foregoing magnetization 15 of the domain-control regions 12A and 12B eliminates domain formation in the magneto-resistive layer 13, and hence, Barkhausen noise associated with the migration of the magnetic domain wall.

As a result, the magnetization 17 of the free layer in the magneto-resistive layer 13 changes the direction in response the external magnetic signal Hsig, and the magneto-resistance between the pinned layer and the free layer is changed accordingly. This change of the magneto-resistance is detected by causing to flow a sensing current 14 from the electrode 11A to the electrode 11B through the magneto-resistive layer 13 as represented in FIG. 1.

In the construction of FIG. 1, it will be noted that there are formed regions 16A and 16B in the magneto-resistive layer 13, more precisely in the free layer of the magneto-resistive layer 13, in which the direction of magnetization does not change in response to the external magnetic field Hsig, along the boundary to the domain-control region 12A or 12B. It should be noted that the magnetization 15 of the domain-control region 12A or 12B causes a pinning of magnetization in the free layer in correspondence to the foregoing regions 16A and 16B. Thus, the foregoing regions 16A and 16B form a dead zone. In view of the fact that the sensing current 14 flows through such dead zones 16A and 16B, the signal-to-noise ratio of the sensing current 14, and hence the sensitivity of the spin-valve magnetic sensor 10 of FIG. 1, is inevitably deteriorated. This problem becomes particularly conspicuous when the magneto-resistive region 13 has a reduced width W.

In order to overcome the foregoing problem, there is a proposal of a spin-valve magnetic sensor 20 according to a related art as represented in FIG. 2, wherein those parts corresponding to the parts explained with reference to FIG. 1 are designated by the same reference numerals and the description thereof will be omitted.

Referring to FIG. 2, the spin-valve magnetic sensor 20 has a construction similar to that of the spin-valve magnetic sensor 10 of FIG. 1 except that the electrodes 11A and 11B are formed so as to extend over the magneto-resistive layer 13 to form overhang regions 28A and 28B respectively.

More specifically, the overhang region 28A of the electrode 11A extends beyond the dead zone 16A on the top surface of the magneto-resistive layer 13, while the overhang region 28B of the electrode 11B extends beyond the dead zone 16B on the top surface of the magneto-resistive layer 13. As noted previously, the top surface of the magneto-resistive layer 13 is covered by the metal cap film such as a Ta film.

According to the construction of FIG. 2, the sensing current 14 is caused to flow while avoiding the dead zones 16A and 16B, and the sensitivity of the magnetic sensor 20 is improved over the magnetic sensor 10 of FIG. 1. The spin-valve sensor 20 of FIG. 2 is called an "overlay type sensor."

In the overlay type sensor 20 of FIG. 2, it will be noted that the sensing current is injected into the magneto-resistive layer 13 across the interface between the electrode 11A and the magneto-resistive layer 13 or the interface between the electrode 11B and the magneto-resistive sensor 13. Thus, the electric property of the metal cap film, typically a Ta film, provided on the top surface of the magneto-resistive layer 13 becomes important in the overlay type magnetic sensor 20 of FIG. 2. As noted previously, such a metal cap film is provided to protect the anti-ferromagnetic pinning layer in the magneto-resistive layer 13 during the photolithographic process. As a photolithographic process includes various processes conducted in the atmosphere such as resist process, there is a substantial risk that the surface of the metal cap film is oxidized. In the case of a Ta cap film, for example, there is a possibility that the surface of the Ta cap film is covered by an oxide film of $Ta_2O_5$.

It will be understood that the existence of such an oxide film on the surface of the metal cap film increases the resistance of the sensing current path, and the signal-to-noise ratio of the magnetic sensor is deteriorated. In addition, there is a possibility that the sensing current 14 avoids the oxide film and flows along the path of FIG. 1. In this case, the sensing current 14 flows through the dead zones 16A and 16B and the signal-to-noise ratio of the magnetic sensor is deteriorated.

In addition, the abutting type sensor 20 of FIG. 2 has another problem, in relation to the fabrication process thereof, in that the metal cap film of Ta may be etched during the etching process to form the electrodes 11A and 11B. Thus, when there is an excessive etching during the etching process for patterning the electrodes 11A and 11B, the anti-ferromagnetic layer constituting a part of the magneto-resistive layer 13 may be damaged. In such a case, the exchange coupling magnetic field Hua caused by the anti-ferromagnetic layer would be influenced and the magneto-resistance of the magnetic sensor may be degraded seriously.

SUMMARY OF THE INVENTION

Accordingly, it is a general object of the present invention to provide a novel and useful giant magneto-resistive sensor wherein the foregoing problems are eliminated.

Another and more specific object of the present invention is to provide a giant magneto-resistive sensor having a miniaturized size and simultaneously a high sensitivity for magnetic field detection.

Another object of the present invention is to provide a magneto-resistive sensor, comprising:

a magneto-resistive structure changing a resistance thereof in response to an external magnetic field, said magneto-resistive structure;

a cap layer provided on a top surface of said magneto-resistive structure;

a pair of magnetic regions disposed at both lateral sides of said magneto-resistive structure, said magnetic regions having a magnetization pointing in a common direction;

a pair of electrodes provided on said pair of magnetic regions so as to oppose with each other across said magneto-resistive structure, said electrodes having respective overhang parts extending over said magneto-resistive structure so as to oppose with each other with a gap therebetween, wherein each of said overhang parts covers said cap layer on said magneto-resistive structure in such a state that an oxidation-resistant conductive layer is interposed between said cap layer and said overhang part.

According to the present invention, the problem of increase of contact resistance at the interface between the cap layer and the electrode, caused as a result of oxidation of the cap layer surface during a patterning process of the magneto-resistive structure in the conventional overlay type giant magneto-resistive sensor, is effectively and positively eliminated by covering the cap layer by the oxidation-resistant conductive layer such as Au. As a result of decrease of the contact resistance, the magnetic sensor of the present invention can provide an improved signal-to-noise ratio, and hence an improved sensitivity. As a result of forming the overhang part in both electrodes, the current path of the sensing current successfully avoids the dead zone of the magneto-resistive structure, wherein the present invention can ensure that the sensing current path avoids the dead zone-by reducing the contact resistance immediately underneath the overhang parts.

Other objects and further features of the present invention will become apparent from the following detailed description when read in conjunction with the attached drawings.

DETAILED DESCRIPTION OF THE INVENTION

Next, a spin-valve magnetic sensor 200 according to a preferred embodiment of the present invention will be described with reference to FIGS. 3A–3H showing a fabrication process of the spin-valve sensor 200.

Figure 3A:
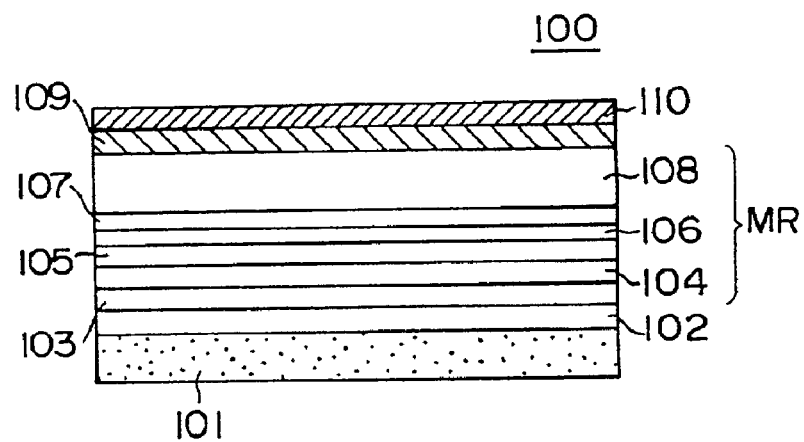
FIGS. 3A–3H are diagrams showing the fabrication process of a spin-valve magnetic sensor according to an embodiment of the present invention.

Referring to FIG. 3A, a spin-valve structure 100 is constructed on a Si substrate 101 covered with an $SiO_2$ film (not shown), wherein the spin-valve structure 100 includes a foundation layer 102 of Ta formed on the substrate 101 with a thickness of about 5 nm. On the foundation layer 102, a ferromagnetic free layer 103 is formed by depositing a NiFe alloy layer and a CoFeB layer consecutively on the foundation layer 102 with respective thicknesses of 2 nm and 1.5 nm.

On the free layer 103, a non-magnetic separation layer 104 is formed by depositing a Cu layer with a thickness of about 2.8 nm, and a first pinned layer 105 of CoFeB is formed on the non-magnetic layer 104 with a thickness of about 2 nm. Further, an exchange-coupling layer 106 of Ru and a second pinned layer 107 of CoFeB are deposited consecutively on the first pinned layer 105 with respective thicknesses of 0.82 nm and 1.5 nm, and an anti-ferromagnetic pinning layer 108 of PdPtMn is deposited on the second pinned layer 107 with a thickness of about 13 nm. The layers 103–108 form an ordinary spin-valve film MR.

The spin-valve film MR thus formed is further covered with a cap film 109 of Ta with a thickness of about 6 nm, wherein the cap film 109 protects the anti-ferromagnetic layer 108 during the photolithographic patterning process of the spin-valve structure 100 so as to reduce the width W in conformity with the small track width on the high-density magnetic disk. The cap film 109 should not cause a reaction with the anti-ferromagnetic layer 108, and thus, it has been practiced to use Ta for this purpose.

In the present embodiment, it should be noted that the cap film 109 is further covered with a conductive protective film 110 of Au with a thickness of about 5 nm. Thereby, the cap film 109 and the conductive protective film 110 are formed consecutively in a sputtering apparatus in continuation to the process of forming the spin-valve layer MR, without breaking the vacuum. Thus, there is no chance at all for the cap film 109 to be oxidized, and an excellent contact is achieved at the interface between the anti-ferromagnetic film 108 and the Ta cap film 109 and further at the interface between the Ta cap film 109 and the Au conductive protective film 110.

Figure 1:
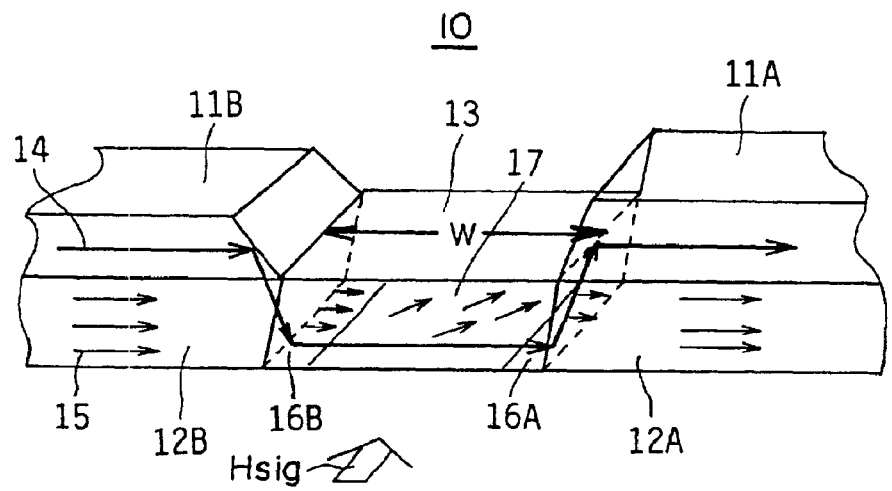
FIG. 1 is a diagram showing the construction of a magneto-resistive magnetic sensor according to a related art.
Figure 2:
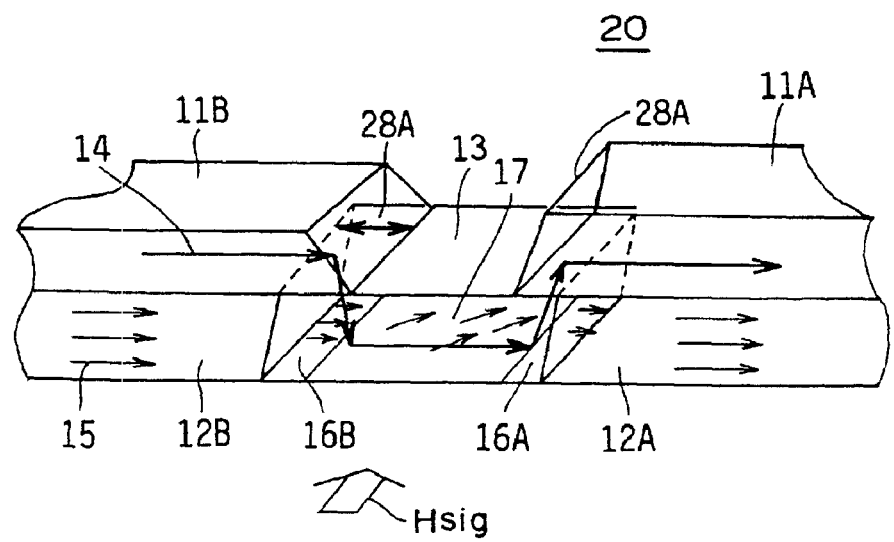
FIG. 2 is a diagram showing the construction of a magneto-resistive magnetic sensor according to another related art.
Figure 3B:
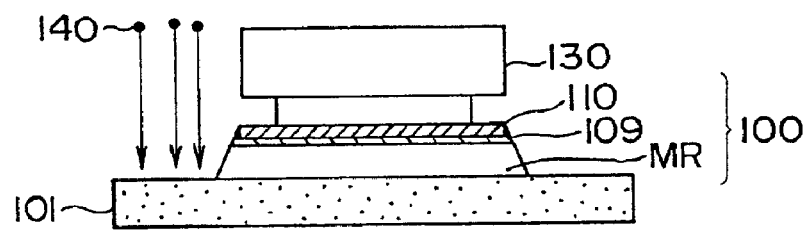

Next, in the step of FIG. 3B, a resist pattern 130 having a thickness of 1.0 μm is provided on the Au film 110 according to the desired size and shape of spin-valve structure 100 to be formed as in the case of the magneto-resistive layer 13 of FIG. 2, and an ion milling process using Ar ions 140 is applied so as to pattern the layers 102–110 of the spin-valve structure 100 of FIG. 3A while using the resist pattern 130 as a mask. In FIG. 3B, it should be noted that the layers 102–108 are collectively designated as the spin-valve layer MR, as noted previously. As a result of the ion milling patterning process, which acts substantially perpendicularly to the substrate 101, the spin-valve layer MR and the layers 109 and 110 thereon, in other words the spin-valve structure 100 of FIG. 3A, are patterned in accordance with the resist pattern 130.

Figure 3C:
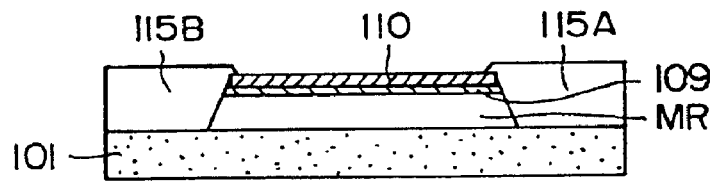

Next, in the step of FIG. 3C, a ferromagnetic layer of CoCrPt is deposited at both lateral sides of the patterned spin-valve structure 100 by a sputtering process while using the resist pattern 130 as a mask, and domain control regions 115A and 115B of CoCrPt are formed in correspondence to the domain control regions 12A and 12B of FIG. 2. It should be noted that FIG. 3C shows the state in which the resist pattern 130 is removed by an ashing process after the formation of the domain control regions 115A and 115B.

Figure 3D:
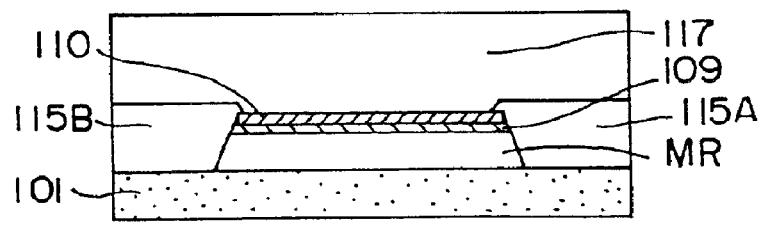

Next, in the step of FIG. 3D, a Ta film (not shown) is deposited on the structure of FIG. 3C uniformly with a thickness of about 7 nm including the top surface of the domain control regions 115A and 115B and the top surface of the Au protective layer 110, and an electrode layer 117 of Mo is deposited further thereon by a sputtering process with a thickness of about 50 nm.

Figure 3E:
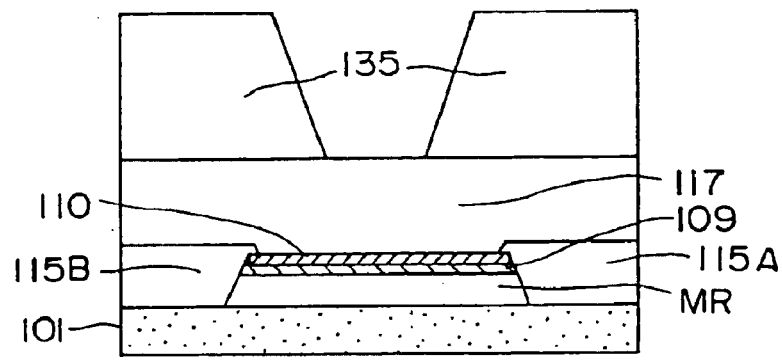

Further, a step of FIG. 3E is conducted in which a resist pattern 135 having a thickness of about 1 μm is formed on the structure of FIG. 3D, and the resist pattern 135 is formed to have a resist opening so as to expose a part of the electrode layer 117 to be removed, wherein the foregoing exposed part of the electrode layer 117 corresponds to a central part of the structure patterned in the step of FIG. 3B.

During the resist process of FIG. 3E, it is again noted that there is no chance at all for the Ta cap film 109 to contact with the air, as the Ta cap film 109 is covered entirely by the Au protective film 110. Thus, formation of undesirable oxide on the top surface of the Ta cap film 109 is positively and inherently prevented.

Figure 3F:
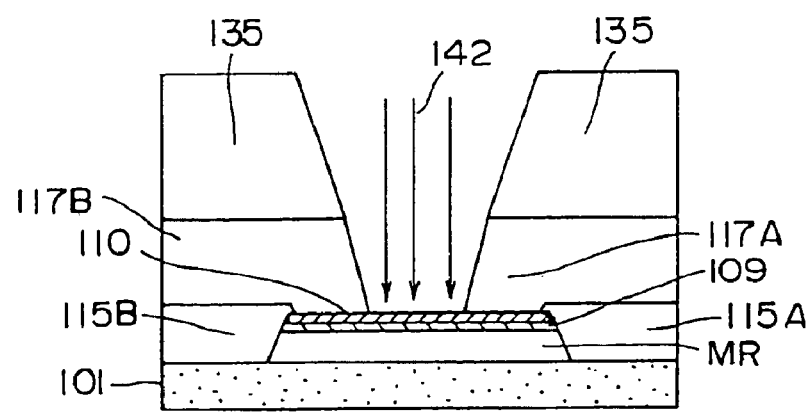

Next, in the step of FIG. 3F, a reactive ion etching process using $SF_6$ 142 as an etching gas is applied to the electrode layer 117 through the resist opening until the Au protective film 110 is exposed, and electrodes 117A and 117B are formed from the electrode layer 117 such that the electrodes 117A and 117B oppose with each other on the top surface of the Au protective film 110. As noted previously, the Au protective film 110 covers the Ta cap film 109 on the top surface of the spin-valve layer MR.

It should be noted that the reactive ion etching process of FIG. 3F reacts selectively upon the Au protective film 110 and stops spontaneously upon exposure of the Ta cap film 109. Further, it should be noted that an attempt to extend the duration of the etching process in the step of FIG. 3F by 20% over the nominal etching time to expose the top surface of the protective film 110 has revealed the fact that no exposure of the underlying Ta cap film 109 is caused, indicating that a sufficient margin is secured for the reactive ion etching process during the process of patterning the electrodes 117A and 117B.

The electrodes 117A and 117B thus formed have respective overhang parts extending toward each other over the top surface of the Au protective film 110 similarly to the overlay-type magnetic sensor 20 of FIG. 2.

Figure 3G:
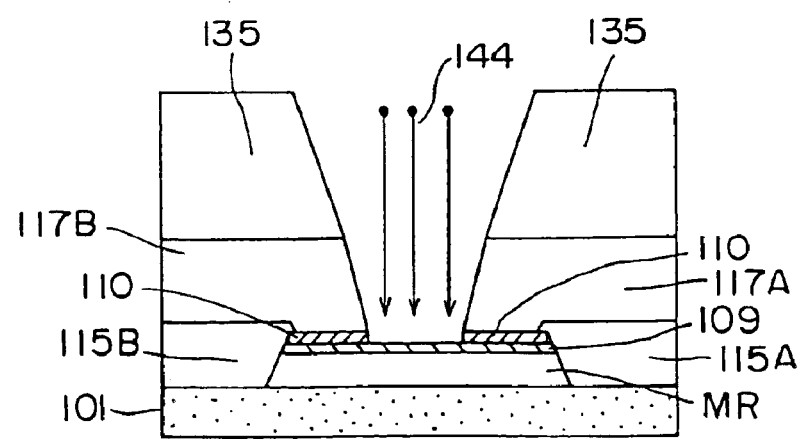

Next, in the step of FIG. 3G, an ion milling process is applied to the structure of FIG. 3F while using Ar ions 144 impinging in the direction generally perpendicularly to the substrate 101 for several seconds, and the exposed part of the Au protective film 110 is removed. As a result of removal of the low-resistance Au protective film from the region between the electrodes 117A and 117B, the shunt current path of the sensing current is eliminated.

By using an ion milling process, which acts selectively upon an Au film in the step of FIG. 3G, the ion milling process stops substantially spontaneously upon the exposure of the Ta film 109, and the risk that the top surface of the spin-valve layer MR being exposed is effectively avoided.

Figure 3H:
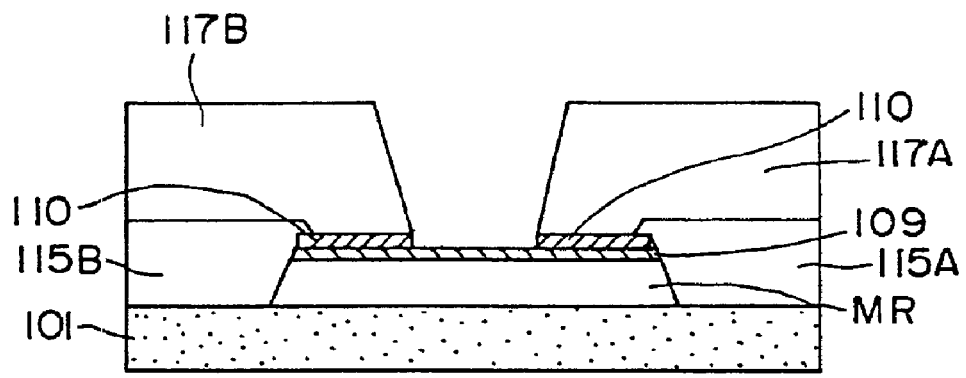

After removal of the resist pattern 135 by a plasma ashing process or a chemical process, the spin-valve magnetic sensor 200 as represented in FIG. 3H is obtained.

Thus, the top surface of the Ta cap film 109 contacting with the electrode 117A or 117B and serving for a part of the current path of the sensing current is protected by the Au protective film 110 throughout the process. Thus, there is no chance at all that an oxide film is formed on the top surface of the Ta cap film 109 and a low resistance is guaranteed for the sensing current path. Thereby, it should be noted that the Au protective film 110 has an inherently low resistance, and the spin-valve magnetic sensor 200 of the present embodiment provides an excellent performance for feeble magnetic detection. Further, the spin-valve magnetic sensor 200 can be formed to have an extremely reduced width as a result of application of a photolithographic patterning process.

Figure 4:
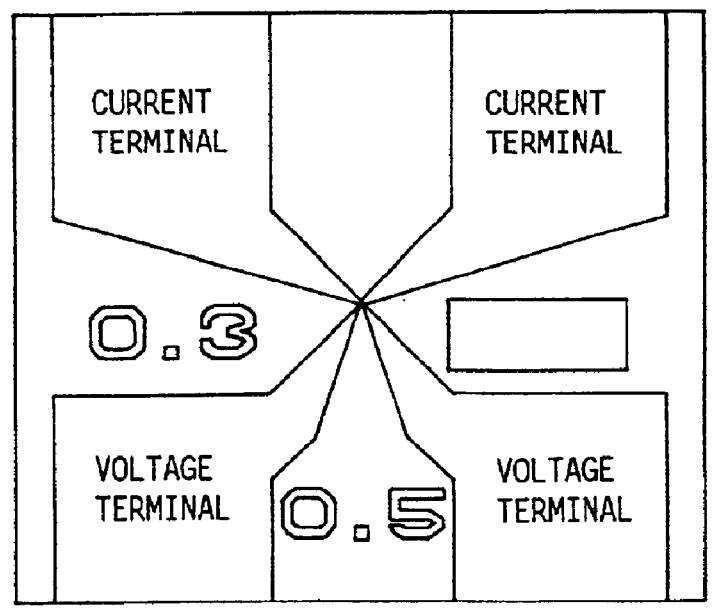
FIG. 4 is a diagram showing the construction used for evaluating the spin-valve magnetic sensor of the present embodiment.

Next, the spin-valve magnetic sensor 200 is evaluated by using a four-terminal TEG (test element group) pattern represented in FIG. 4.

Figure 5:
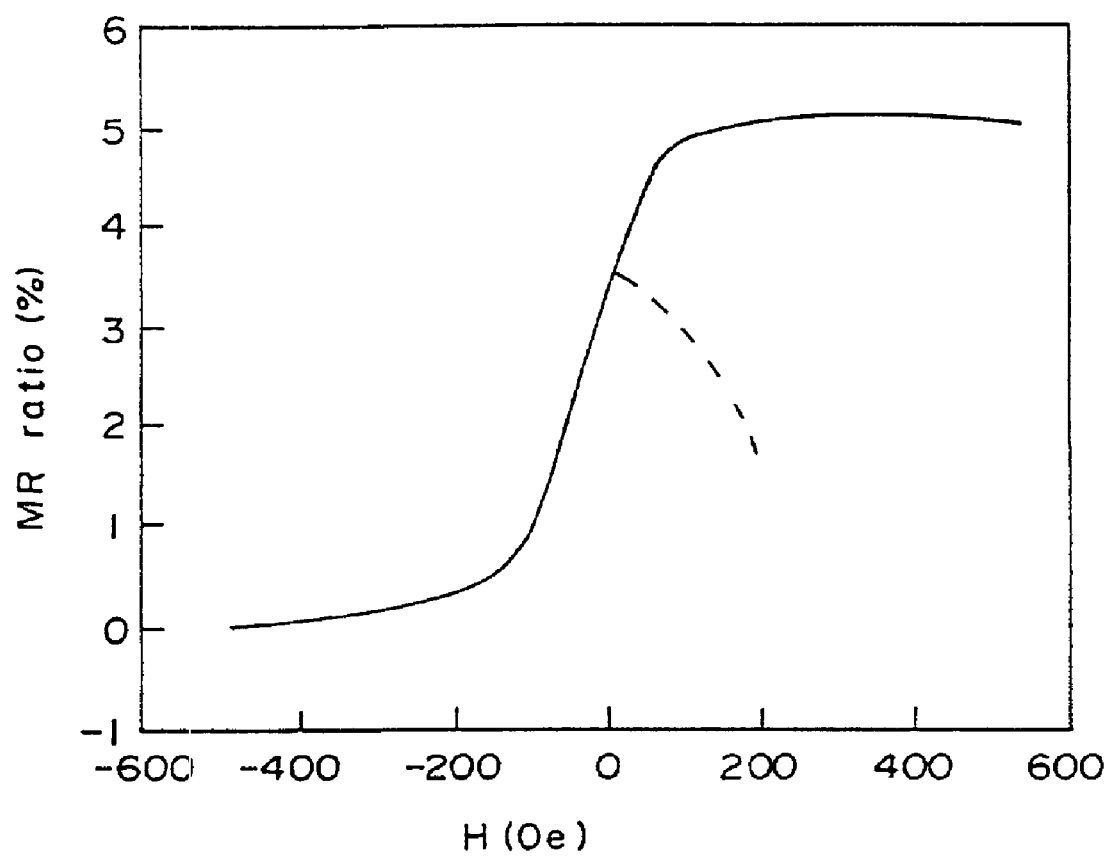
FIG. 5 is a diagram showing the operational characteristic of the spin-valve magnetic sensor of the present embodiment.

FIG. 5 shows the result of the evaluation.

More specifically, FIG. 5 represents the relationship between the MR (magneto-resistive) ratio and the strength of the external magnetic field H.

As can be seen from FIG. 5, the spin-valve magnetic sensor 200 of the present embodiment can achieve the MR ratio of as much as 5% in response to the change of the external magnetic field H from −400 Oe (−3.2×10$^4$ A/m) to +400 Oe (+3.2×10$^4$ A/m). When there is formed an oxide layer on the surface of the Ta cap film 109 as in the case of the overlay type sensor of FIG. 2, on the other hand, the MR ratio cannot exceed 4% as represented in FIG. 5 by a broken line.

Figure 6:
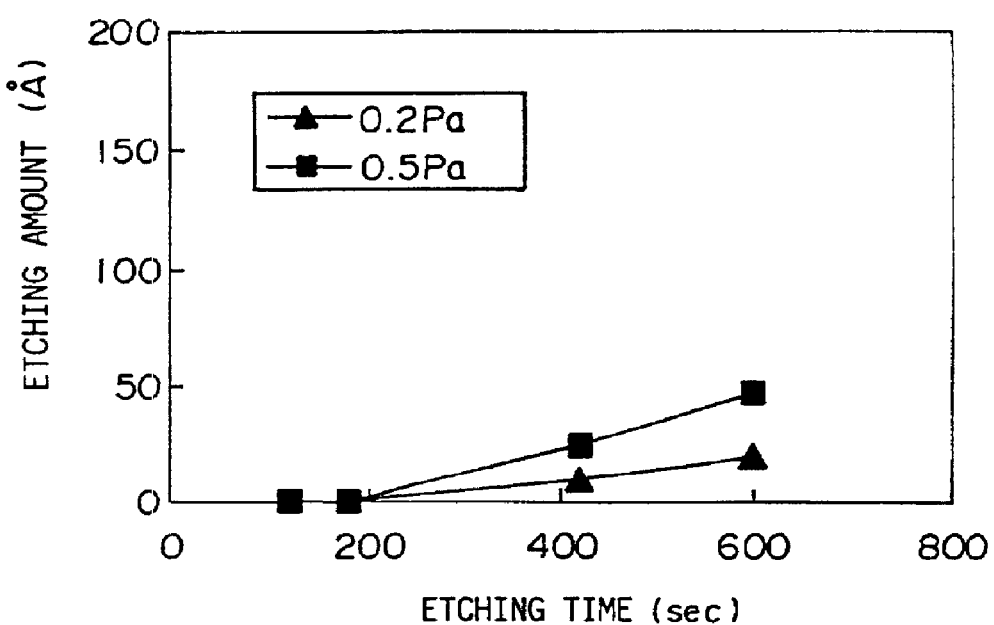
FIG. 6 is a diagram showing the relationship between an etching amount and etching time of an Au film.

FIG. 6 shows the result of the experiments conducted for evaluating the state of the protective film 110 formed on the Ta cap film 109 in the spin-valve sensor 200 of the present embodiment.

In the experiment, a Si substrate covered with an SiO2 film was prepared for a test body and a Ta film and an Au film were deposited on the substrate consecutively with respective thicknesses of 10 nm and 70 nm.

The test body thus formed was then subjected to a reactive ion etching process while using a fluoric etching gas (SF$_6$) in evaluation for the etching rate of the Au film. The etching was conducted under a pressure of 0.2 Pa and 0.5 Pa while using a plasma power of 100 W and a bias power of 10 W.

FIG. 6 shows the etching rate thus observed, wherein the solid squares represent the result for the case the process pressure was set to 0.5 Pa, while the solid triangles represent the result for the case the process pressure was set to 0.2 Pa.

Referring to FIG. 6, it can be seen that the etching rate of the Au film is extremely low, in the order of only 0.08 Å/s, wherein the relationship of FIG. 6 was obtained by an X-ray fluorescent analysis.

The relationship of FIG. 6 indicates that an Au film provides a very small etching rate, and thus, the Au protective film 110 of the spin-valve magnetic sensor 200 functions as an effective etching stopper when patterning the electrodes 117A and 117B in the step of FIG. 3F. Naturally, the Ta cap film 109 underneath the Au protective film 110 is protected from the reactive ion etching process. Thereby, the etching process of FIG. 3F can be conducted easily, without risking the underlying Ta film 109 to be damaged.

Figure 7A:
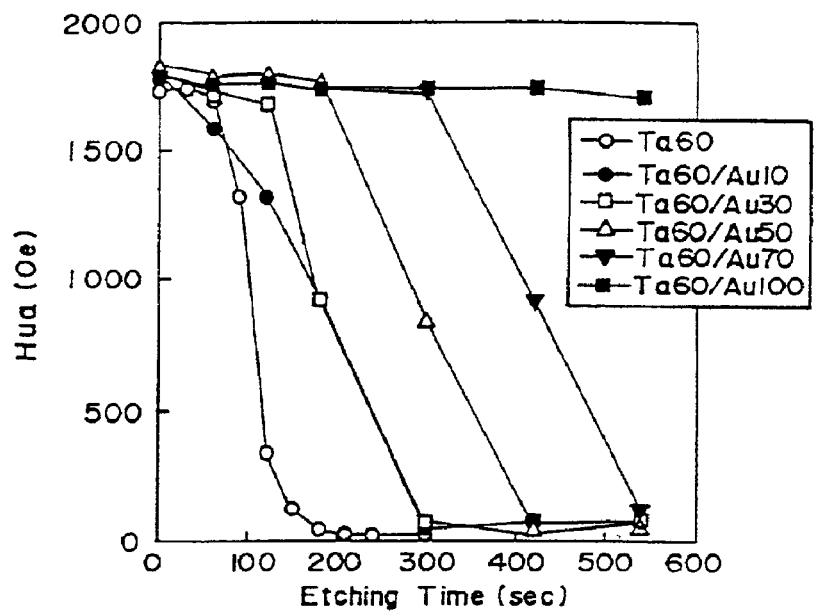
FIGS. 7A and 7B are diagrams showing the operational characteristic of the spin-valve magnetic sensor of the present embodiment for various thicknesses of the Au film.
Figure 7B:
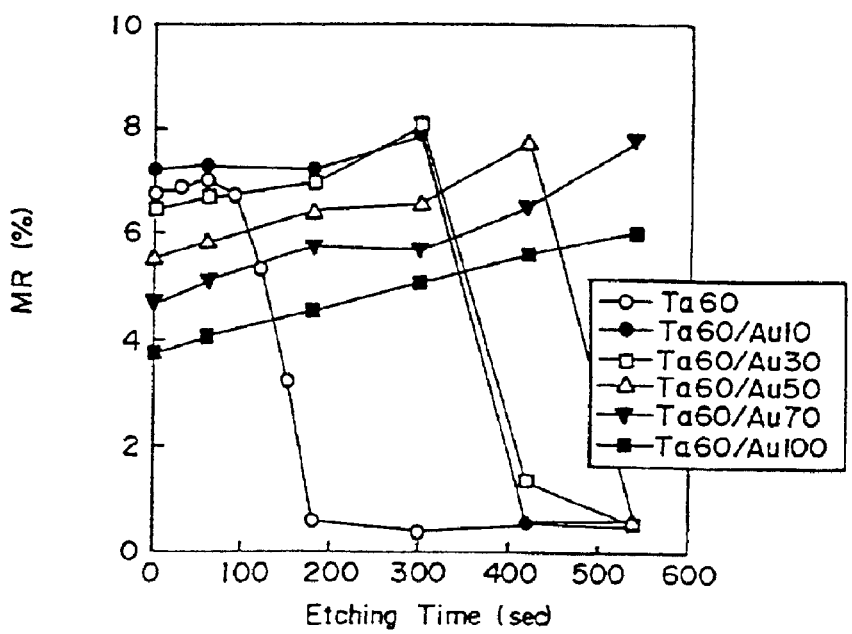

FIGS. 7A and 7B show the result of experiments conducted on the effect of the Au protective film 110 on the magnetic property of the spin-valve structure 100 of FIG. 3A.

Thus, a test body was formed by depositing a Ta foundation film on a Si substrate covered with an SiO$_2$ film, with a thickness of 5 nm, and a ferromagnetic free layer, a non-magnetic separation layer, a first pinned layer, an intermediate coupling layer, a second pinned layer, and an anti-ferromagnetic pinning layer were formed consecutively on the Ta foundation layer. In the experiments, a stacking structure of a NeFe alloy layer and a CoFeB layer was used for the ferromagnetic layer with respective thicknesses of 2 nm and 1.5 nm. Further, a Cu layer having a thickness of 2.8 nm was used for the non-magnetic separation layer, a CoFeB layer having a thickness of 2 nm was used for the first pinned layer, a Ru layer having a thickness of 0.8 nm was used for the intermediate coupling layer, a CoFeB layer having a thickness of 1.5 nm was used for the second pining layer, and a PdPtMn layer having a thickness of 13 nm was used for the anti-ferromagnetic pinning layer.

The spin-valve structure thus formed was further covered with a cap film of Ta having a thickness of 6 nm (60 Å) and a conductive protective film of Au consecutively, wherein the thickness of the conductive protective film was changed variously.

More specifically, specimens having the Au film with the thicknesses of 1 nm (10 Å), 3 nm (30 Å), 5 nm (50 Å), 7 nm (70 Å) and 10 nm (100 Å) were prepared and each of the specimens were subjected to the reactive ion etching process conducted under the pressure of 0.5 Pa and the substrate temperature of 20° C. while using the SF$_6$ etching gas, the plasma power of 100 W, the bias power of 10 W, and the d.c. bias voltage Vdc of 10V, for various durations.

FIG. 7A shows the relationship between the observed pinning magnetic field Hua of the anti-ferromagnetic layer and the etching time, wherein open circles represent the case in which no Au protective film is provided, solid circles represent the case in which the Au protective film is provided with a thickness of 1 nm, open squares represent the case in which the Au protective film is provided with a thickness of 3 nm, open triangles represent the case in which the Au protective film is provided with a thickness of 5 nm, solid triangles represent the case in which the Au protective film is provided with a thickness of 7 nm, and solid squares represent the case in which the Au protective film is provided with a thickness of 10 nm.

Referring to FIG. 7A, it can be seen that the pinning magnetic field Hua drops sharply after 100 seconds when there is no Au protective film provided on the Ta cap film, indicating the existing of damages in the anti-ferromagnetic layer as a result of the reactive ion etching process. This decrease of the pinning magnetic field Hua is improved when the Au protective film is provided with the thickness of 1 nm or more, and the degree of improvement clearly increases with the thickness of the Au protective film exceeding about 3 nm. When the thickness of the Au protective film has reached 10 nm, no substantial decrease is observed for the pinning magnetic field Hua.

FIG. 7B shows the MR ratio of the spin-valve magnetic sensor 200 formed according to the process of FIGS. 3A–3H while using the spin-valve structure thus formed for various thicknesses of the Au protective layer. Similarly as before, the thickness of the Ta cap layer was set to 6 nm throughout. Similarly to FIG. 7A, open circles represent the case in which no Au protective film is provided, solid circles represent the case in which the Au protective film is provided with a thickness of 1 nm, open squares represent the case in which the Au protective film is provided with a thickness of 3 nm, open triangles represent the case in which the Au protective film is provided with a thickness of 5 nm, solid triangles represent the case in which the Au protective film is provided with a thickness of 7 nm, and solid squares represent the case in which the Au protective film is provided with a thickness of 10 nm.

Referring to FIG. 7B, it can be seen that the MR ratio drops sharply after 100 seconds when there is no Au protective film provided on the Ta cap film, while it is noted that the MR ratio of 6–8 is maintained for the duration of 100 seconds when the Au protective film is provided with the thickness of 1 nm. Further, the duration of the high MR ratio increases when the Au protective film has exceeded the thickness of about 3 nm.

The relationship of FIG. 7B further indicates the tendency of increase of the MR ratio with the etching time before it starts the sharp dropping. It is believed that this tendency is caused as a result of the thinning of the Au protective film on the Ta cap film with the progress of the etching and associated interruption of the shunting current flowing through the Au protective film from the electrodes 117A to the electrode 117B, or vice versa.

From the experiments of FIG. 7A and 7B, it is concludes that the Au protective film 110 of the spin-valve magnetic sensor 200 is preferably formed with the thickness of 3 nm or more.

In the process of FIGS. 3F and 3G, it should be noted that these process may be conducted in a single ion milling process. In this case, the fabrication process is simplified.

Further, it will be understood that the feature of the present invention of providing a Ta cap film 109 and the Au protective film 110 on a magneto-resistive structure is by no means limited to a spin-valve magnetic sensor but is applicable similarly to an ordinary magneto-resistive sensor that uses a single ferromagnetic layer such as FeNi alloy. Further, the present invention is applicable also to a spin-valve magnetic sensor in which the order of stacking of the layers is reversed. In this case, the Ta cap film 109 and the Au protective film 110 protect the ferromagnetic free layer 103, which is now provided at the top part of the spin-valve structure 100.

It should be noted that any oxidation-resistant low-resistance metal be used for the foregoing protective film 110. Thus, the protective film 110 may be formed of a metal selected from the group consisting of Au, Pt and Cu.

Further, the present invention is not limited to the embodiments described heretofore, but various variations and modifications may be made without departing from the scope of the invention.

What is claimed is:

1. A magneto-resistive magnetic sensor, comprising:
   a magneto-resistive structure changing a resistance thereof in response to an external magnetic field,
   a cap layer, provided on a top surface of said magneto-resistive structure;
   a pair of domain-controlling magnetic regions disposed at both lateral sides of said magneto-resistive structure, said domain-controlling magnetic regions having a magnetization pointing in a common direction;
   a pair of electrodes provided on said pair of domain-controlling magnetic regions so as to extend on a top surface of said magneto-resistive structure and so as to oppose each other across a central part of said magneto-resistive structure, said electrodes having respective overhang parts extending over said magneto-resistive structure so as to oppose each other with a gap therebetween, said pair of electrodes injecting a sensing current into said magneto-resistive structure primarily via said top surface of said magneto-resistive structure,
   wherein each of said overhang parts covers said cap layer on said magneto-resistive structure in such a state that an oxidation-resistant conductive layer is interposed between said cap layer and said overhang part,
   said pair of domain-controlling magnetic regions having a coercive force exceeding a coercive force of a ferromagnetic layer used in said magneto-resistive structure as a free layer, and
   said oxidation-resistant conductive layer having a substantially uniform thickness.

2. A magneto-resistive magnetic sensor as claimed in claim 1, wherein said oxidation-resistant conductive layer is formed of a metal selected from the group consisting of Au, Pt and Cu.

3. A magneto-resistive magnetic sensor as claimed in claim 1, wherein said oxidation-resistant conductive layer has a thickness larger than about 1 nm.

4. A magneto-resistive magnetic sensor as claimed in claim 1, wherein said oxidation-resistant conductive layer has a thickness of larger than about 3 nm.

5. A magneto-resistive magnetic Sensor as claimed in claim 1, wherein said oxidation-resistant conductive layer has a thickness of smaller than about 10 nm.

6. A magneto-resistive magnetic sensor as claimed in claim 1, wherein said cap layer comprises Ta.

7. A magneto-resistive magnetic sensor as claimed in claim 1, wherein said magneto-resistive structure comprises an anti-ferromagnetic pinning layer, a ferromagnetic pinned layer having an exchange coupling with said anti-ferromagnetic pinning layer, said ferromagnetic free layer, and a non-magnetic separation layer interposed between said ferromagnetic pinned layer and said ferromagnetic free layer.

8. A magneto-resistive magnetic sensor, comprising:
   a magneto-resistive structure changing a resistance thereof in response to an external magnetic field, said magneto-resistive structure having a top surface and two tapered lateral sides;
   a cap layer, provided on said top surface of said magneto-resistive structure;
   a pair of magnetic regions disposed at both lateral sides of said magneto-resistive structure, said magnetic regions having a magnetization pointing in a common direction;
   a pair of electrodes provided on said pair of magnetic regions so as to oppose each other across said magneto-resistive structure, said electrodes having respective overhang parts extending over said top surface of said magneto-resistive structure so as to oppose each other with a gap therebetween, said pair of electrodes injecting a sensing current into said magneto-resistive structure primarily via said top surface of said magneto-resistive structure,
   wherein each of said overhang parts covers said cap layer on said magneto-resistive structure in such a state that an oxidation-resistant conductive layer is interposed between said cap layer and said overhang part, and
   further wherein said oxidation-resistant conductive layer has a substantially uniform thickness.

9. A magneto-resistive magnetic sensor as claimed in claim 8, wherein said oxidation-resistant conductive layer is formed of a metal selected from the group consisting of Au, Pt and Cu.

10. A magneto-resistive magnetic sensor as claimed in claim 8, wherein said oxidation-resistant conductive layer has a thickness larger than about 1 nm.

11. A magneto-resistive magnetic sensor as claimed in claim 8, wherein said oxidation-resistant conductive layer has a thickness of larger than about 3 nm.

12. A magneto-resistive magnetic sensor as claimed in claim 8, wherein said oxidation-resistant conductive layer has a thickness of smaller than about 10 nm.

13. A magneto-resistive magnetic sensor as claimed in claim 8, wherein said cap layer comprises Ta.

14. A magneto-resistive magnetic sensor as claimed in claim 8, wherein said magneto-resistive structure comprises an anti-ferromagnetic pinning layer, a ferromagnetic pinned layer having an exchange coupling with said anti-ferromagnetic pinning layer, a ferromagnetic free layer, and a non-magnetic separation layer interposed between said ferromagnetic pinned layer and said ferromagnetic free layer.

15. A magneto-resistive magnetic sensor as claimed in claim 8, wherein said pair of magnetic regions has a coercive force exceeding a coercive force of a ferromagnetic layer used in said magneto-resistive structure as a free layer.

16. A magneto-resistive magnetic sensor as claimed in claim 15, wherein said magnetic regions are domain-controlling magnetic regions.

17. A magneto-resistive magnetic sensor, comprising:
- a magneto-resistive structure changing a resistance thereof in response an external magnetic field,
- a cap layer, provided on a top surface of said magneto-resistive structure;
- a pair of domain-controlling magnetic regions disposed at both lateral sides of said magneto-resistive structure, said domain-controlling magnetic regions having a magnetization pointing in a common direction;
- a pair of electrodes provided on said pair of domain-controlling magnetic regions so as to extend on a top surface of said magneto-resistive structure and so as to oppose each other across a central part of said magneto-resistive structure, said electrodes having respective overhang parts extending over said magneto-resistive structure so as to oppose each other with a gap therebetween, said pair of electrodes injecting a sensing current into said magneto-resistive structure primarily via said top surface of said magneto-resistive structure, wherein each of said overhang parts covers said cap layer on said magneto-resistive structure in such a state that an oxidation-resistant conductive layer is interposed between said cap layer and said overhang part, and said pair of domain-controlling magnetic regions having a coercive force exceeding a coercive force of a ferromagnetic layer used in said magneto-resistive structure as a free layer.

* * * * *

UNITED STATES PATENT AND TRADEMARK OFFICE
CERTIFICATE OF CORRECTION

PATENT NO. : 6,954,341 B2
DATED : October 11, 2005
INVENTOR(S) : Kamata et al.

It is certified that error appears in the above-identified patent and that said Letters Patent is hereby corrected as shown below:

Column 11,
Line 10, insert -- to -- between "response" and "an".

Column 12,
Line 12, insert -- substantially entirely -- between "is" and "interposed".
Line 12, insert -- in an area -- between "interposed" and "between".

Signed and Sealed this

Eleventh Day of April, 2006

JON W. DUDAS
*Director of the United States Patent and Trademark Office*